July 14, 1959
N. R. GUILBERT, JR
2,894,275
SNUBBING MEANS FOR RECIPROCATING ELEMENTS
Filed May 18, 1956
2 Sheets-Sheet 1
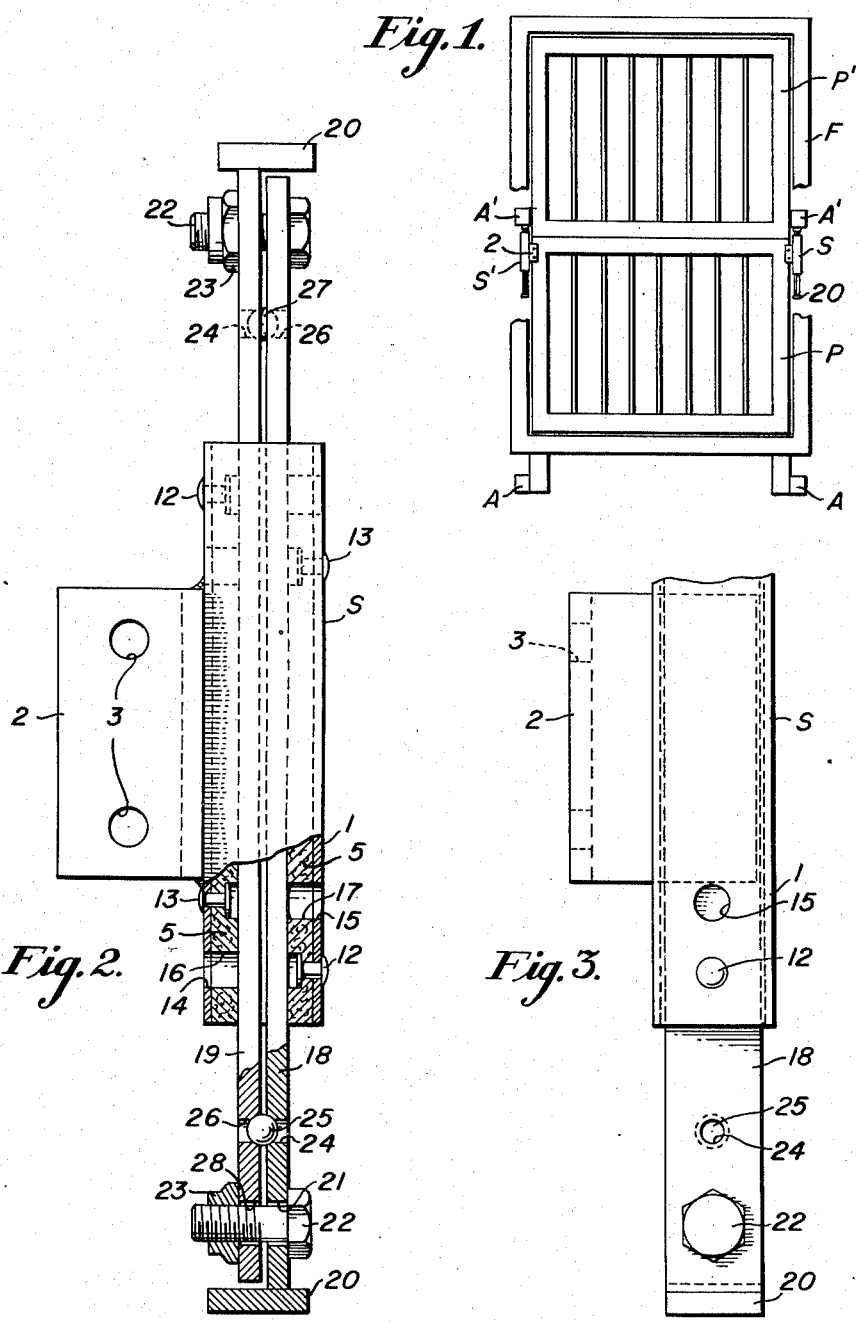
INVENTOR
NICHOLAS R. GUILBERT JR.
BY
ATTORNEY July 14, 1959  N. R. GUILBERT, JR  2,894,275
SNUBBING MEANS FOR RECIPROCATING ELEMENTS
Filed May 18, 1956  2 Sheets-Sheet 2

INVENTOR
NICHOLAS R. GUILBERT JR.
BY
ATTORNEY

United States Patent Office 2,894,275
Patented July 14, 1959

2,894,275

SNUBBING MEANS FOR RECIPROCATING ELEMENTS

Nicholas R. Guilbert, Jr., Chestnut Hill, Pa.

Application May 18, 1956, Serial No. 585,815

6 Claims. (Cl. 16—82)

The present invention relates to means for snubbing or arresting the motion of a reciprocating element to bring it to rest alternately at the limits of its normal travel by relatively gradual deceleration and especially to snubbing means adapted for association with the doors and gates of elevators or the like to diminish or eliminate violent impact and rebound with attendant strain on the parts when such relatively heavy elements are suddenly stopped while being moved rapidly by hand or mechanical actuating means from one limit of travel to the other.

In modern elevators, particularly freight elevators such as are in common use in factories, warehouses and the like, fairly massive, fire-resistant sliding doors are provided at the floor openings to the elevator hatchways and the cabs with usually vertically sliding gates. These doors and gates whether opened and closed manually or mechanically are customarily moved at fairly high speed and when positive abutments or stops are provided and abruptly contacted at the limits of travel of the door or gate the resulting impact subjects the parts to severe strain and their natural elasticity often causes objectionable rebound, while relatively yielding stops, if used, although perhaps cushioning the impact, accentuate the tendency to rebound.

It is therefore a principal object of my invention to provide means effective at the limits of travel of a reciprocating element to absorb energy therefrom by a frictional drag and thereby relatively quickly but smoothly decelerate the motion of the element to bring it quietly and positively to rest at its limits of travel yet without impairing its movement otherwise at relatively high speed between such limits.

A further object is to provide a snubber embodying adjustable friction means adapted for actuation in opposite directions in a reciprocating path for arresting the motion of a reciprocating element with which it is associated only during a brief period just prior to attainment by the element of the respective limits of its travel.

A still further object is to provide snubbing means of the character aforesaid in which the inherent elasticity of metallic bars is utilized to afford an adjustable engagement with friction means to thereby permit the snubber to be accommodated to the circumstances under which it is to be employed, and in which the amount of snubbing action exerted readily can be controlled to a nicety.

Other objects, purposes and advantages of the invention will hereinafter more fully appear or be understood from the following description of certain embodiments of it in which reference will be had to the accompanying drawings.

In the latter, Fig. 1 is a somewhat schematic view of a typical bi-parting elevator door with which snubbers embodying my invention may be associated, showing a pair of them carried by the lower leaf of the door;

Fig. 2 is an enlarged side elevation of one of the snubbers apart from the door and partly broken away into section better to illustrate internal construction;

Fig. 3 is a fragmentary front elevation thereof looking from the right in Fig. 2;

Figure 4:
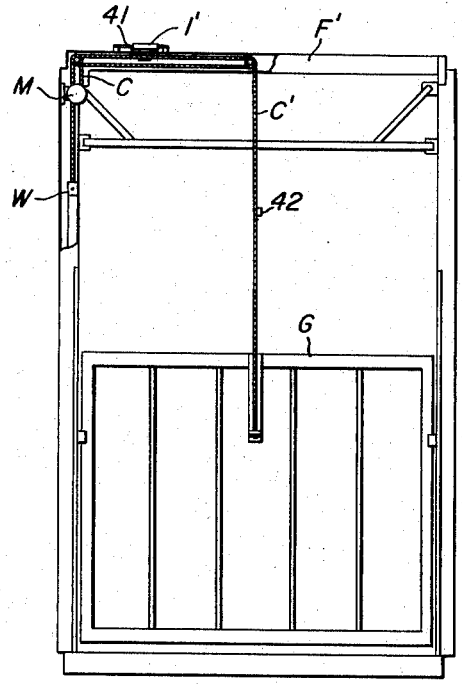
Fig. 4 is a schematic view generally corresponding to Fig. 1 but showing a snubber of slightly modified structure associated with the vertically movable gate of an elevator cab.

Referring now more particularly to the drawings, it will be appreciated that in Fig. 1 the door comprising relatively vertically movable panels P, P' associated with a door frame F is to be considered as typical of structures with which the snubbers of my invention may desirably be employed and not as limiting their use or application to other purposes. Likewise, stops or abutments A, A' may be of any suitable character and adapted for engagement by the snubbers to bring door panel P to rest at the limits of its travel, means (not shown) being provided for interconnecting panels P, P' to cause them to move in unison and other means for mechanically actuating them such as are well known in the art may be utilized if desired, actuating means for the doors constituting no part of the invention.

The snubbers S, S' in Fig. 1 are identical in structure and applied to panel P at its opposite edges; therefore but one of them is illustrated in detail in Figs. 2 and 3. Thus as shown in the latter figures, each snubber comprises a sleeve or tube 1 preferably rectangular in cross section having a mounting bracket 2 secured to one of its sides and provided with mounting holes 3 through which bolts (not shown) may be inserted for affixing the sleeve to a reciprocating element such as panel P of an elevator door. Within this sleeve at opposite faces thereof are disposed friction linings 5 preferably made of what is commonly known as brake lining or other material of similar nature. These lining pieces are secured to the tube in any suitable way as by rivets 12, 13, holes 14, 15 in the tube opposite the respective rivets affording means for introducing a suitably shaped anvil or the like for supporting the rivets while they are being headed over, the linings having registering holes 16, 17 for a like purpose. Extending through and oppositely beyond the tube and engaging the opposed faces of the linings therein are a pair of relatively inverted stop bars 18, 19 of rectangular cross section and in this embodiment of the invention identical in structure, each having a foot 20 at one end, a hole 21 for receiving a bolt 22 secured by a nut 23 adjacent the foot, a hole 24 providing sockets for fulcrum balls 25 and 27 respectively spaced therefrom, a similar socket hole 26 adjacent its opposite end and a hole 28 for receiving the bolt 22 proximate the latter end. When these bars are disposed in relatively inverted relation and balls 25 and 27 inserted between them in the sockets provided by the registering holes 24 and 26, the bolts 22 and nuts 23 may be set up and tightened or loosened to afford the desired pressure of the bars against the friction linings, utilizing the balls as fulcrums for levers of the first class. The bars are thus maintained under appropriate oppositely outward bending stress to insure generation of an appropriate degree of friction between them and the linings when the bars as a unit are moved longitudinally in the sleeve.

It will be appreciated that in the interests of symmetry the bars are shown in Figs. 2 and 3 with the sleeve positioned at approximately their mid points, a relationship not normally a static one when the snubber is in operation, since when the sleeve is operatively assembled with a reciprocal element such as door panel P and the latter is in fully closed or fully open position, the bar unit is at one end of its travel in the sleeve with the foot of one bar engaging abutment A or A' as the case may be, so that when the door is moving between the limits of its travel the bar unit remains at one or the other limit of its travel in the sleeve until displaced therefrom following engagement of the other foot with the other abutment. It will thus be apparent that as the element to which the snubber is secured is reciprocated from one limit of its travel to the other, alternate engagement of the feet of the bar unit with the abutments causes the bar unit to reciprocate in the sleeve against the frictional resistance provided by the linings. This resistance, regulated by the adjustment of bolts 22, thus dissipates or absorbs the energy of the reciprocating element and brings the latter quietly to rest at the respective limits of its travel but without imposing frictional resistance to its movement in either direction until just prior to attainment of such limits. Hence the movement of the bar unit in the sleeve as each limit of travel of the reciprocating element is attained automatically resets the bar unit to position for snubbing the motion of the element as it nears its other limit and no frictional drag of the snubber must be overcome at initiation of reverse movement of the element. Moreover, if for any reason the reciprocating element is stopped by other means prior to attaining either limit of its travel so that the snubber is thus not reset, on a subsequent reciprocation of the element in the normal manner automatic resetting occurs and the ordinary and intended operation of the snubber thereupon is resumed.

An important feature of my invention resides in the fact that the adjustment of the amount or degree of friction exerted by the snubber can be regulated to a nicety merely by manipulation of bolts 22, an operation which readily can be performed by a relatively unskilled individual and even though the snubber be located in a not easily accessible position, while once the desired adjustment be attained the snubber is capable of satisfactory operation for a long period without attention, the wear on its component parts being substantially negligible under ordinary conditions of use.

Figure 5:
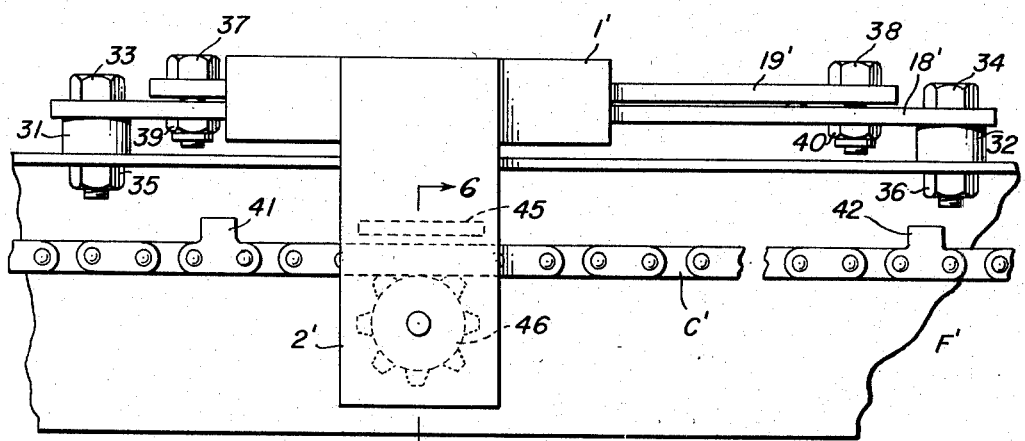
Fig. 5 is a fragmentary enlarged front elevation of a detail thereof showing the snubber and certain associated parts.
Figure 6:
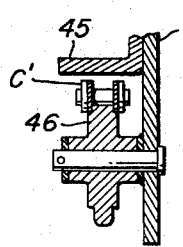
Fig. 6 is a fragmentary vertical section on the line 6—6 in Fig. 5.

In the snubber illustrated in Figs. 4, 5 and 6 substantially similar principles of operation and adjustment are employed but in this instance the bars 18', 19' instead of being identical and provided with feet are devoid of the latter and differ in other minor respects. Thus one bar 18', longer than its mate, is mounted on spacing sleeves 31, 32 and secured by bolts 33, 34 and nuts 35, 36 to a fixed portion F' of an elevator cab frame while its mate, the second bar 19', is secured to the first by bolts 37, 38 and nuts 39, 40. Automatic means including a motor M and chain C for actuating elevator gate G of the cab are indicated in the drawings but merely to facilitate understanding of this application of the invention, of which they form no part. A chain C' connecting gate G over suitable sprockets with a counterweight W may also be standard components, spaced lugs 41, 42 being secured to the chain to engage the snubber and thereby arrest the gate and counterweight assembly through its operation. In this embodiment of the invention the snubber sleeve 1' is provided with a plate 2' generally corresponding to bracket 2 but carrying a stop 45 overlying an idler sprocket 46 engaging chain C' whereby the chain is constrained to pass near to the stop and insure engagement with the latter successively and alternately of lugs 41, 42. These are respectively positioned on the chain to bring the latter and hence the gate and counterweight to rest through actuation of the snubber at the respective limits of the gate travel, each snubbing action as in the snubber heretofore described resetting the snubber for operation in the opposite direction when actuated by the other lug on the chain.

While it is perhaps not essential that my snubber on each reciprocation of the element be fully reset for subsequent action at the extreme limit of relative motion between the friction lined sleeve and the bar unit it is desirable that sufficient relative movement of these parts occur to afford adequate snubbing action for the reciprocating element on its return movement to the other limit of its travel.

It will be appreciated from the foregoing description of two embodiments of the invention shown as associated respectively with an elevator door and an elevator gate that snubbers embodying similar principles of operation may be utilized for arresting the movement of substantially any reciprocating or oscillating element having fixed limits of travel and that they are thus herein shown and described without limitation upon their utility.

Consequently while I have herein shown and described the said embodiments with considerable particularity it is to be understood I do not desire thereby to be limited or confined in any way as changes and modifications in the form, structure, arrangement and relationship of the several parts or components and in their coaction with each other as well as with respect to the reciprocating or oscillating elements with which they are associated will readily occur to those skilled in the art and may be utilized if desired without departing from the spirit and scope of the invention as defined in the appended claims.

Having thus described my invention, I claim and desire to protect by Letters Patent of the United States:

1. A snubber of the character described comprising a sleeve having friction means on opposed inner faces thereof, a two-part bar unit extending through said sleeve and comprising opposed bars respectively engaging said friction means, fulcrum means interposed between the bars adjacent the ends thereof, clamping means for the bars respectively disposed between said fulcrum means and the adjacent extremities of the bars for flexing said bars about said fulcrum means to thereby adjust the pressure exerted on said friction means by the mid-sections of said bars, and means coacting with the sleeve and bar unit for effecting relative reciprocation thereof in response to movements of a reciprocating element in approaching the respective limits of its travel.

2. A snubber as defined in claim 1 including means for mounting one of the bars in fixed relation to a stationary support for the reciprocating element and means movable in correspondence to movements of said reciprocating element for moving the sleeve and said friction means relatively to the bar unit in opposite directions during approach of said reciprocating element toward its respective limits of travel to thereby decelerate it in proportion to the frictional resistance to relative movement between the sleeve and bar unit.

3. In a snubber for a reciprocating member, a tubular element, opposed frictional linings within the element, a bar unit extending through the element and projecting outwardly beyond its ends, said unit comprising complementary opposed generally parallel spaced bars each having a surface engaging one of the linings, adjustable means adjacent one end of the unit operable to compress the bars toward each other, and fulcrum means interposed between the bars inwardly of the adjustable means whereby compression of the bar ends by operation of the adjustable means is effective to bow outwardly the portions of the bars extending on the opposite side of the fulcrum means to thereby regulate the outward pressure of the bars on the linings in correspondence to the inward pressure exerted on the bars by said adjustable means.

4. A snubber for a reciprocating element comprising a tubular element, opposed frictional linings disposed within said tubular element, a reciprocal unit extending into and oppositely beyond said tubular element comprising a pair of complementary spaced bars each having a surface engaging one of the linings, fulcrum means disposed between the bars, adjustable clamping means embracing the bars outwardly from said fulcrum means with respect to said tubular element for flexing the portion of the bars extending inwardly from the fulcrum means and thereby controlling the pressure exerted against said linings, means for mounting the tubular element in fixed relation to the reciprocating element, and means causing relative reciprocation of the bar unit with respect to the tubular element in correspondence to movements of the reciprocating element toward and in the vicinity of the respective limits of its travel.

5. A snubber for a reciprocating element comprising a tubular element, opposed frictional linings disposed within said tubular element, a reciprocal unit extending into and oppositely beyond said tubular element comprising a pair of complementary spaced bars each having a surface engaging one of the linings, fulcrum means disposed between the bars, adjustable clamping means embracing the bars outwardly from said fulcrum means with respect to said tubular element for flexing the portion of the bars extending inwardly from the fulcrum means and thereby controlling the pressure exerted against said linings, means for mounting the tubular element in fixed relation to the reciprocating element for movement therewith between its limits of reciprocatory travel, and means engageable by the bar unit for effecting relative movement thereof within the tubular element and in frictional relation with said linings adjacent said limits to thereby frictionally decelerate the reciprocating element alternately during its approach toward said limits.

6. A snubber for a reciprocating element comprising a tubular element, opposed frictional linings disposed within said tubular element, and a reciprocal unit extending into and oppositely beyond said tubular element comprising a pair of complementary spaced bars each having a surface engaging one of the linings, fulcrum means disposed between the bars, and adjustable clamping means embracing the bars outwardly from said fulcrum means with respect to said tubular element for flexing the portion of the bars extending inwardly from the fulcrum means and thereby controlling the pressure exerted against said linings, said fulcrum means comprising a substantially spherical bearing element embraced by said bars and engaging in opposed substantially circular sockets therein and said adjustable clamping means including a bolt and a nut embracing the bars between said bearing element and the adjacent ends of the bars.

References Cited in the file of this patent

UNITED STATES PATENTS

| | | |
|---|---|---|
| 1,242,134 | Borgmann | Oct. 9, 1917 |
| 1,597,274 | Herrmann | Aug. 24, 1926 |
| 1,732,269 | Hack | Oct. 22, 1929 |